United States Patent [19]

Fabian et al.

[11] Patent Number: 5,594,207
[45] Date of Patent: Jan. 14, 1997

[54] SELF-LOCKING DIVIDER PLATE FOR AN ELECTRICAL BOX

[75] Inventors: Mark E. Fabian, St. Jean; Serge Michaud, Brossard, both of Canada

[73] Assignee: Thomas & Betts Corporation, Memphis, Tenn.

[21] Appl. No.: 246,458

[22] Filed: May 20, 1994

[30] Foreign Application Priority Data

Jun. 2, 1993 [CA] Canada .................................... 2097544

[51] Int. Cl.$^6$ .............................................. H01R 13/508
[52] U.S. Cl. ........................ 174/58; 174/53; 220/3.3; 220/4.02; 220/4.32; 220/529; 220/533; 220/545
[58] Field of Search .................... 174/53, 58, 57; 220/3.2, 3.3, 3.94, 4.02, 4.31, 528, 529, 533, 545, 3.7, 4.32

[56] References Cited

U.S. PATENT DOCUMENTS

| | | |
|---|---|---|
| 1,296,811 | 3/1919 | Keller . |
| 1,929,844 | 10/1933 | Haas ........................................... 247/16 |
| 3,472,945 | 10/1968 | Trachtenberg ............................ 174/53 |
| 3,587,906 | 6/1971 | Pepe ........................................ 220/3.2 |
| 4,202,457 | 5/1980 | Tansi ........................................ 220/3.3 |
| 4,455,449 | 6/1984 | Rendel ..................................... 174/53 |

*Primary Examiner*—Kristine L. Kincaid
*Assistant Examiner*—Dean A. Reichard
*Attorney, Agent, or Firm*—Michael L. Hoelter; Salvatore J. Abbruzzese

[57] ABSTRACT

A self-locking divider plate made of flat sheet metal is provided in an electrical box to form separate compartments. The electrical box has several upper and lower front ledges which form aligned slots which in turn, cooperate to receive the divider plate. The side edges of the divider plate has a biased sheared tab which locks the plate in place between the slots upon installation of the plate into the box. These sheared tabs extend outwardly from one of the planar surfaces of the plate. When the plate is inserted into two aligned front slots, the tabs are pushed inwardly toward the planar surface of the plate, and spring back to their normal position when the plate is in its proper position in the box. The tabs engage an inside surface of the ledges when the plate is moved outwardly from the box to prevent its accidental removal. Tangs on the back edge of the plate fit into slots in the back wall of the box, and tangs on a front edge of the plate adjacent to the sheared tabs engage the walls of the slots to position and secure the divider plate within the box.

16 Claims, 4 Drawing Sheets

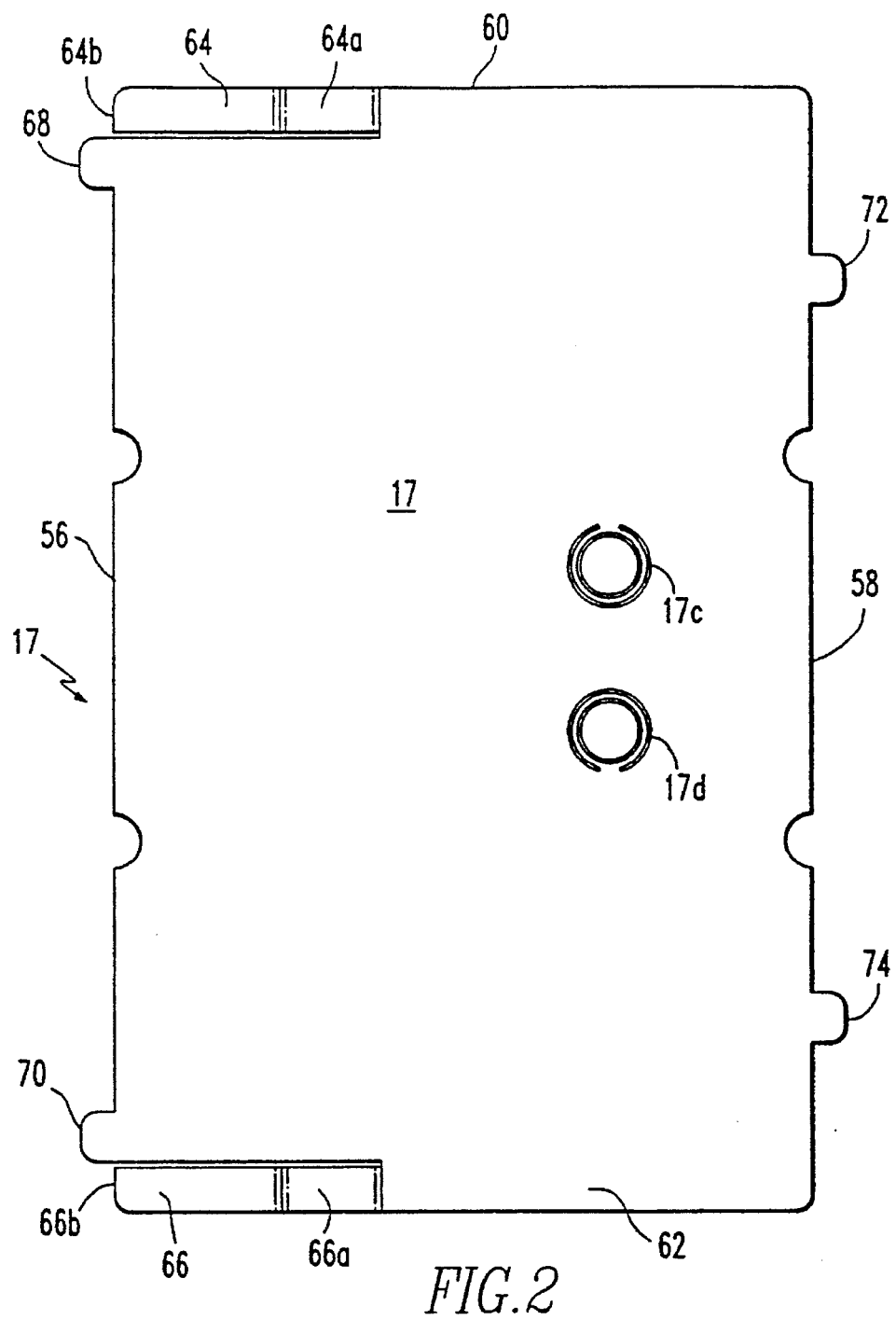

SELF-LOCKING DIVIDER PLATE FOR AN ELECTRICAL BOX

BACKGROUND OF THE INVENTION

1. Field of the Invention

The invention relates to a divider plate defining at least two physically separated compartments in an electrical box, which can be safely used for carrying a power conductor outlet and a communication conductor outlet together in the same box.

2. Description of Prior Art

The number of communication outlets which have to be located close to an electrical receptacle has greatly increased during the last few years. This has been caused by the growth in the usage of communication and entertainment equipment such as telephone recording machines, facsimile transfer equipment, PC computers, cable connected television, VCR's, etc.

In the past, in order to provide the communication connection for the equipment, a box, which supports a wall plate containing a communication outlet, was mounted on a wall stud. For convenience, this box was often located close to an outlet box containing the power receptacle. The building code for various countries, including the United States, prohibits the mixing of power and communication cables which carry different potentials in the same box without a physical barrier between them. Therefore, this practice requires that two separate boxes be used.

Generally, the two boxes, one containing the communication receptacle and the other the power receptacle, were mounted on wall studs and were spaced about 16 inches to 24 inches apart which is the distance between the stud centers. This contributed to the maze of cables often present in the back of communication equipment. An alternative for locating the power and the communication outlets close together was accomplished by mounting one of the boxes on the stud and the other on the wall close to it. An expensive "rework box" containing special clamps which allowed the box to be fastened to the wall can be used or often is used in order to locate the two boxes safely close together. The cost of such installation is fairly high and, therefore, this "rework box" is provided only on special request.

One of the most common electrical device boxes used by electricians is the "gangable" type where one or more individual electrical boxes are joined or "ganged" together to provide a mounting for two or more electrical devices. For example, in order to assemble this type of box for mounting two electrical devices, one side is removed from each of the ganged boxes and the two ganged boxes are assembled together by holding screws. This "ganged" arrangement is adequate and approved by the building code for carrying several electrical outlet devices for power equipment alongside each other, but as discussed hereinabove, in order to carry a combination of electrical outlet devices for both communication equipment and power equipment, a barrier or partition must be disposed between the two ganged boxes.

Generally, this partition is held in place with a screw or, alternatively, is not permanently attached at all. Permanently attaching the partition with screws is time consuming, especially if there are a number of partitions to be installed. If the partition is not fixedly held in place, then there is a risk that the partition will move, resulting in a time consuming operation in realigning the partition and/or resulting in a decrease in the safety factor which is unacceptable to the National Electrical Code.

Recently, several improved partitions or divider plates for ganged electrical outlet boxes were developed and are disclosed in patent application bearing U.S. Ser. No. 07/851, 387, filed on Mar. 12, 1992, now abandoned, and assigned to Westinghouse Electrical Corporation, the assignee of the present application. Even though the partitions of U.S. Ser. No. 07/851,387 represent an advance in the art, installation of these partitions of this design require the use of fastening means and tools. Therefore, these partitions may present problems similar to those of the prior art in that their attachment in the boxes may be time consuming. There remains, therefore, a very real and substantial need for an improved barrier or divider plate for an electrical box which does not require external fastening means and accompanying tools for assemblage of the plate within the box.

SUMMARY OF THE INVENTION

The present invention has met the above-described needs. The present invention involves a self-locking removable partition or divider plate which is easily slidable into an electrical box to form separate compartments where one compartment can be used to support or carry a power conductor outlet and the other compartment can be used to support or carry a communication conductor outlet, and the divider plate physically and safely, according to the building code, separates the power lines of the power conductor outlet from the low voltage lines of the communication conductor outlet.

The electrical box has a body with two parallel spaced-apart sidewalls, a back wall, spaced-apart parallel top and bottom walls, and a partially formed front wall. The partially formed front wall consists of several upper and lower ledges of the same length, with neighboring ledges being spaced-apart to form a slot therebetween. A pair of aligned slots formed by cooperating upper and lower ledges receive the divider plate.

The divider plate has biased sheared tabs extending parallel to and along its opposite lateral side edges. A front longitudinal edge of the plate adjacent to the sheared tabs has opposed front tangs, where one tang is disposed adjacent to each sheared tab. A rear longitudinal edge of the plate has opposed rear tangs which are off-set relative to the tangs of the front longitudinal edge.

As the divider plate is slid into its respective pair of slots, the sheared tabs are pushed inwardly by the sidewalls of the slots toward a planar surface of the plate. The rear tangs are caused to enter slots formed in the back wall of the box. When the plate is completely in the box in its operative position, the sheared tabs spring back to their normal sheared position, and the front tangs are disposed in their respective aligned slots formed by the upper and lower ledges and are flushed therewith.

The front and back tangs in their respective slots retain the plate in position in the box by keeping the front and back of the plate from moving laterally within the box. The sheared tabs in their normal sheared position, which position is off-set relative to a planar surface of the plate, prevent the plate from being moved outwardly out of the box; that is, if the plate is pulled outwardly, the face of the sheared tabs engage an inside surface of the upper and lower ledges which form the respective slots in which the plate is disposed. A tool can be used to push the sheared tabs inwardly to allow the plate to be pulled from the box for its removal.

A further embodiment of the invention involves the opposed sheared tabs being substantially shorter than the length of the plate and forming a recessed or opened area extending from the front of the tab to the front longitudinal edge of the plate. Sheared projections are formed in the box by punching the top wall and the bottom wall inwardly near the sheared tabs of the plate once the plate is disposed within the box. These sheared projections in the top and bottom wall of the box extend into the recessed or opened area near the sheared tab of the plate and prevent the plate from moving outwardly from the box. These sheared projections in the walls can be forced toward the respective wall of the box and the plate can be pulled out of the box while the sheared tabs of the divider plate are forced toward a planar surface thereof.

Accordingly, it is an object of the invention to provide a divider plate for an electrical box which is self-locking and easy to install without the use of tool means and easily removed.

A further object of the invention is to provide a divider plate for an electrical box which is self-locking, simple in design, and inexpensive to manufacture.

A still further object of the invention is to provide a divider plate for an electrical box which has integrally formed means for affixing automatically the plate within the box.

A still further object of the invention is to provide a divider plate for an electrical box whose design and installation meets the building code of several countries.

These and other objects of the present invention will be more fully understood and appreciated from the following description of the invention on reference to the illustrations appended hereto.

BRIEF DESCRIPTION OF THE DRAWINGS

FIG. 2 is a side elevational view of the divider plate prior to its installation in an electrical box;

FIG. 3 is a top plan view of the plate of FIG. 2;

DETAILED DESCRIPTION OF THE PREFERRED EMBODIMENTS

Figure 1:
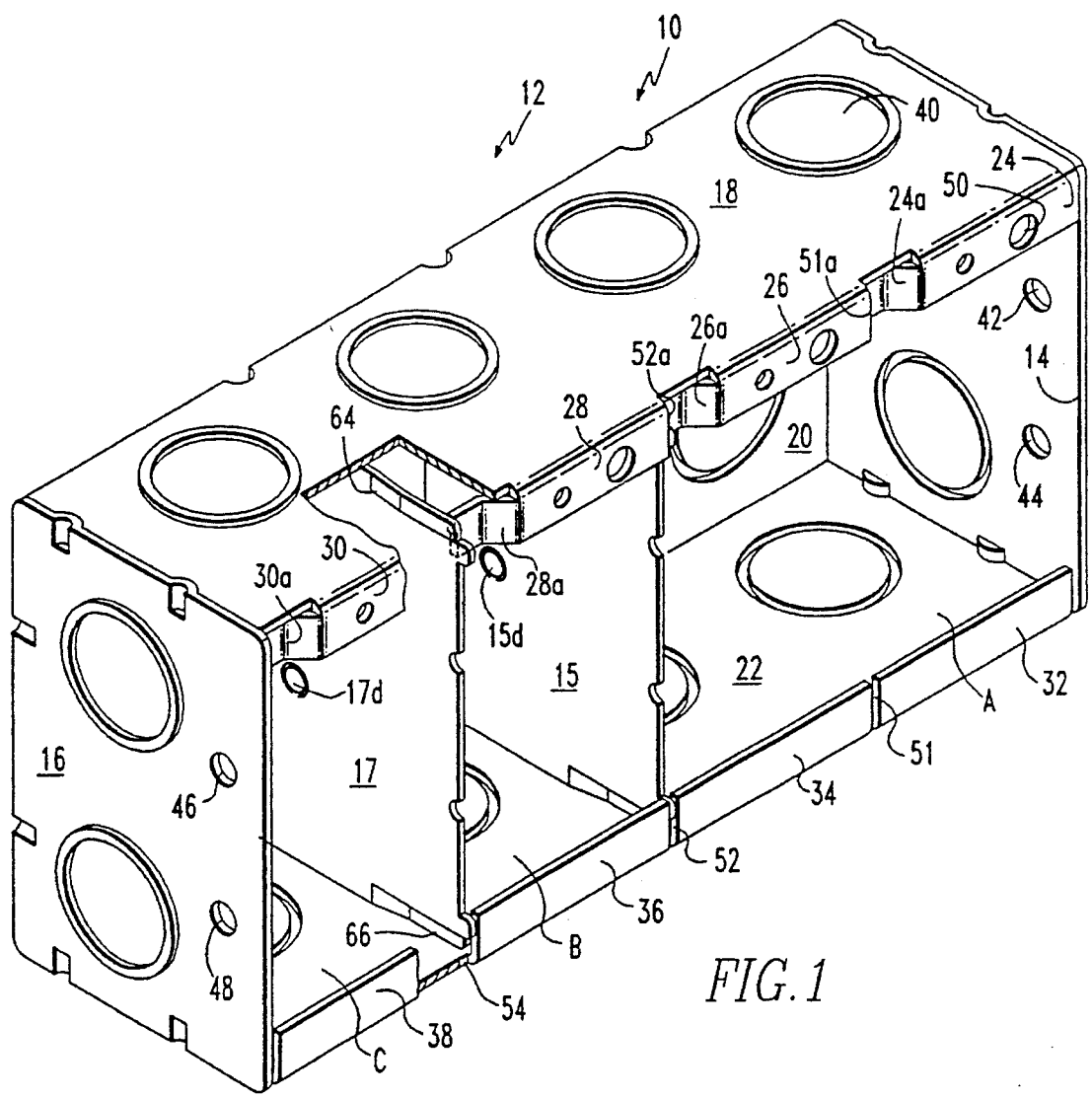
FIG. 1 is a perspective view of an electrical box with divider plates of the present invention mounted therein and with partial breakaway views in the top and bottom of the electrical box to show the positioning of a divider plate therein.

Referring first to FIG. 1, there is shown an electrical box, generally indicated at 10, which is arranged to receive devices, such as communication conductor outlets and power conductor outlets which are mounted alongside each other in the same box. Box 10 comprises a body 12, sidewalls 14 and 16, and divider plates 15 and 17. Divider plates 15 and 17 form compartments A, B, and C. Preferably, plates 15 and 17 are generally flat metal sheets. The body 12 is formed by top wall 18, back wall 20, and bottom wall 22. A partially formed front wall consists of upper ledges 24, 26, 28, and 30, and lower edges 32, 34, 36, and 38. Circular knockouts, one indicated at 40 in top wall 18, are provided in the several walls 14, 16, 18, 20, and 22 of box 10 for selectively being punched out to receive cable connections for the power conductor outlets and/or the communication conductor outlets carried in box 10. Several openings, which are shown in sidewalls 14 and 16 and indicated at 42, 44, 46, and 48 can be used to receive fastening means, such as screws for the mounting of box 10. Even though not shown, similar openings may be provided in walls 18, 20, and 22, for a similar purpose.

Still referring to FIG. 1, as is known in the art, an upper ledge 24–30 cooperates with an opposed lower ledge 32–38 to mount a standard wiring device, such as a power receptacle and/or a communication outlet. Upper ledges 24–30 and lower ledges 32–38 are provided with tapped holes, one indicated at 50 in upper ledge 24, for such fastening of a standard device. As can be seen in FIG. 1, each upper ledge 24–30 has an end portion 24a, 26a, 28a, 30a, respectively, which is pushed inwardly relative to the outer planar surface of its respective ledge 24–30. A tapped hole (not shown) in end portions 24a–30a receive a ground screw for its respective wiring device.

Lower ledges 32–38 are spaced apart relative to each other and two adjacent lower ledges 32–38 form a slot indicated at 51, 52, and 54 in FIG. 1. Similarly, upper ledges 24–30 are spaced apart relative to each other and two adjacent upper ledges 24–30 form a slot. Two such locations are indicated at 51a and 52a. The slots formed by upper ledges 24 and 26, 26 and 28, and 28 and 30 are similar to slots 51, 52, and 54. Slot 51 is aligned with the slot at 51a. Slot 52 is aligned with the slot at 52a and cooperate to receive divider plate 15. A similar slot not numbered is formed by upper ledges 28 and 30, and cooperates with a slot indicated at 54 which is formed by lower ledges 36 and 38 to receive divider plate 17.

As discussed hereinbefore, the arrangement for electrical box 10 of FIG. 1 is used particularly for mounting and carrying a combination of wiring devices, such as power conductor outlets with communication conductor outlets. This is made possible by divider plates 15 and 17 which are encompassed in the teachings of the present invention.

Figure 6:
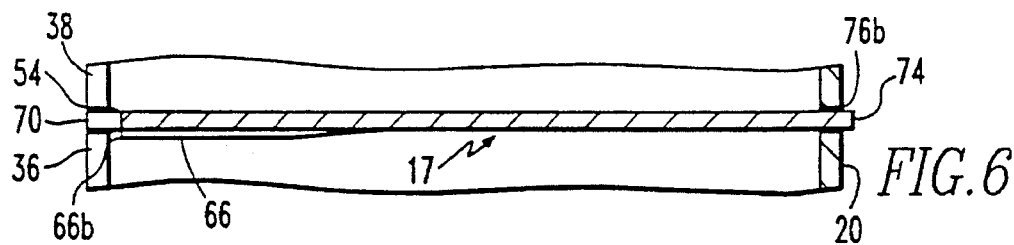
FIG. 6 is a view taken along lines 6—6 of FIG. 4.
Figure 5:
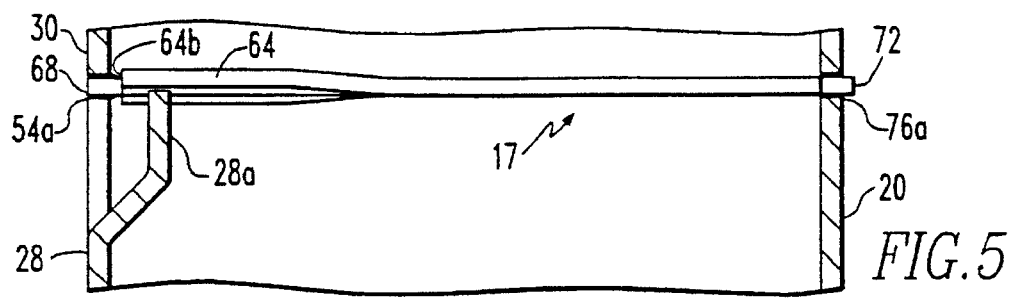
FIG. 5 is a view taken along lines 5—5 of FIG. 4.
Figure 4:
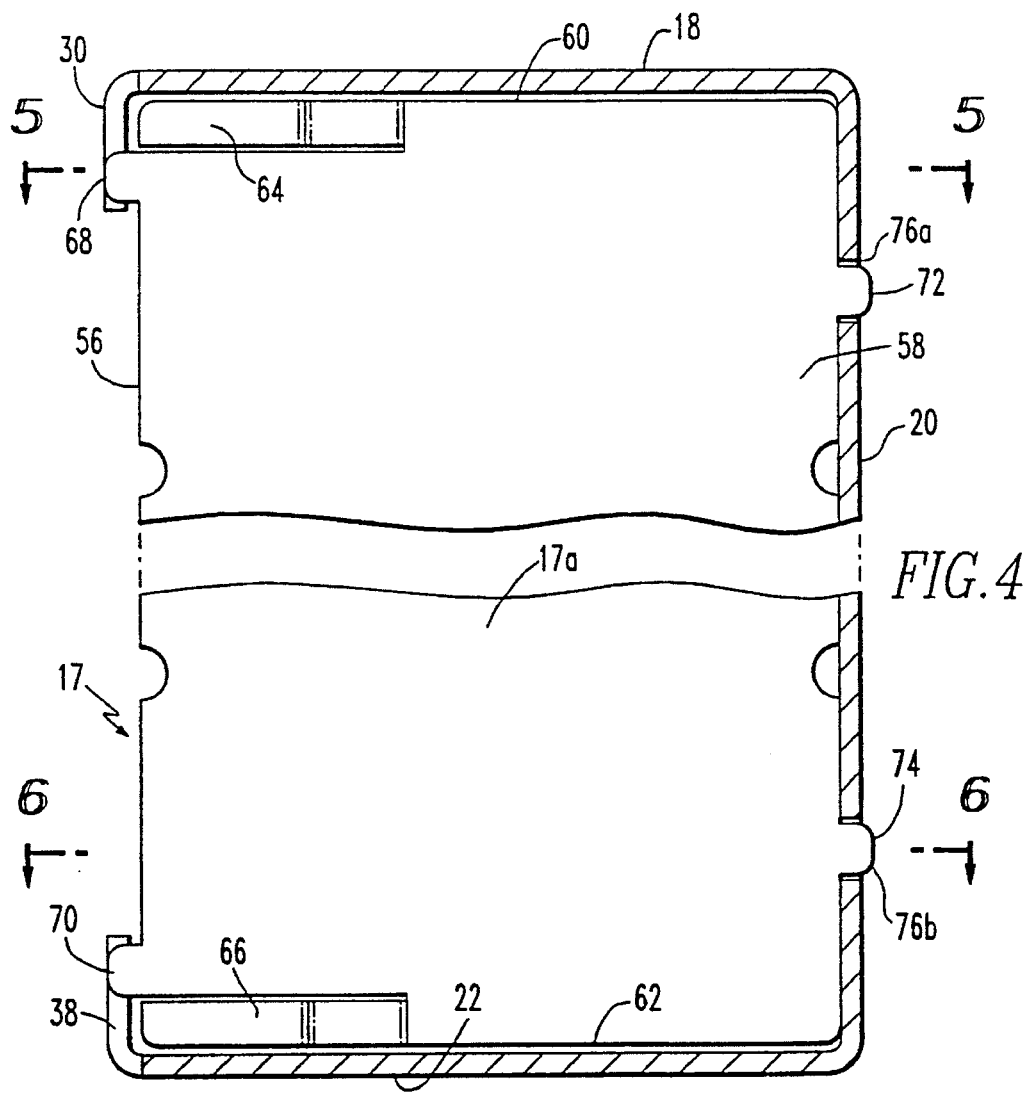
FIG. 4 is a partial side elevational view showing the plate mounted in an electrical box which is in cross section.

FIGS. 2 and 3 more clearly illustrate the construction of plate 17 prior to its installation in electrical box 10, and FIGS. 4, 5 and 6 more clearly illustrate divider plate 17 after its installation in box 10. A detailed discussion of divider plate 17, will now be given with reference to FIGS. 2–6.

Plate 17 is preferably a relatively flat sheet of metal such as commercial quality cold rolled galvanized steel with a thickness of approximately 1/16" and with longitudinal edges 56 and 58 to the left and right of FIGS. 2 and 4, respectively, and side lateral edges 60 and 62. The lateral edges 60 and 62 shown particularly in the top and bottom of FIGS. 2 and 4, are sheared to form integral tabs 64 and 66. Sheared tabs 64,66 are slightly raised away from planar surface or off-set therefrom and extend a substantial length of plate 17 along the entire length of lateral edges 60,62. FIG. 3 best shows this raised relationship of sheared tab 64 relative to the flat planar surface 17a of plate 17 where tab 64 has a transition slope 64a and a front end 64b. These tabs 64,66 are resilient due to the kind of metal material of plate 17 and the structure of tabs 64,66. Immediately adjacent to the front end 64b,66b of sheared tabs 64,66 along longitudinal edge 56 to the left of FIGS. 2 and 4 are tangs 68,70, respectively, which extend outwardly and parallel relative to the planar surfaces 17a and 17b of plate 17. These tangs 68,70, are preferably, an integral part of plate 17 and lie in the same plane as the planar surfaces 17a and 17b of plate 17. Similarly, tangs 72, 74 to the right of FIGS. 2 and 4 are integrally formed in plate 17 to extend therefrom along longitudinal edge 58 and lie in the same plane as planar surfaces 17a and 17b of plate 17. These tangs 72, 74 are off-set relative to tangs 68, 70 and are located further inwardly toward the center of plate 17. FIG. 2 particularly shows knockouts 17c and 17d located in plate 17. These knockouts selectively can be used for wiring in a manner known in the art.

As can be seen in FIGS. 4, 5, and 6, these tangs 72,74 are received in slots 76a and 76b formed in back wall 20, and tangs 68 and 70 are received in slots 54 and 54a, respectively, when plate 17 is properly installed in box 10 of FIG. 1. As shown particularly in FIG. 5, slot 54a is formed by upper ledges 28 and 30. Referring to these FIGS. 4, 5, and 6, the arrangement for tangs 72 and 74 in slots 76a,76b in back wall 20 keeps the back portion of plate 17 from moving axially in box 10. Tangs 68 and 70 in slots 54 and 54a keep the front portion of plate 17 from moving axially in box 10. The arrangement of sheared tabs 64 and 66 in box 10 keeps the plate 17 from moving laterally out of the front of box 10 in that the front end 64b,66b of tabs 64 and 66, respectively, are in alignment with an inside surface of upper ledges 28 and 30 and lower ledges 36 and 38, as best shown in FIGS. 5 and 6, such that if plate 17 is pulled outwardly with reference to FIG. 1, the front end 64b,66b of each tab 64,66 will engage an inside surface of upper ledges 28 and 30 and lower ledges 36 and 38, thereby resisting any further outward movement of plate 17. Installation of plate 17 is accomplished by sliding plate 17 into slots 54 and 54a of FIGS. 5 and 6 in a manner such that tangs 68 and 70 face outwardly as shown in FIG. 1 and tangs 72 and 74 enter and fit snugly in their respective openings 72a,72b in back wall 20. The width of front slots 54 and 54a is slightly greater than the thickness of plate 17 in order to receive plate 17 and so that as plate 17 is being slid into slots 54 and 54a, the sheared tabs 64,66 are caused to be pushed inwardly by the inside surfaces of slots 54, 54a toward the same plane as the planar surfaces 17a and 17b of plate 17. Once properly installed in box 10, sheared tabs 64,66, in view of their resiliency, spring back to their normal sheared position thereby restricting the movement of plate 17 out of box 10. Removal of plate 17 is accomplished by using an appropriate tool such as pliers to flatten sheared tabs 64,66 inwardly and at the same time pulling and sliding plate 17 out of box 10 until it has cleared box 10.

The construction of plate 15 and the method for its installation into and removal from box 10 are similar to that of plate 17.

Figure 8:
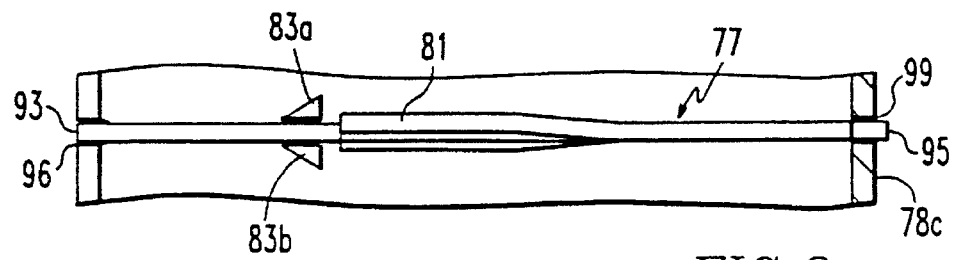
FIG. 8 is a view taken along lines 8—8 of FIG. 7.
Figure 7:
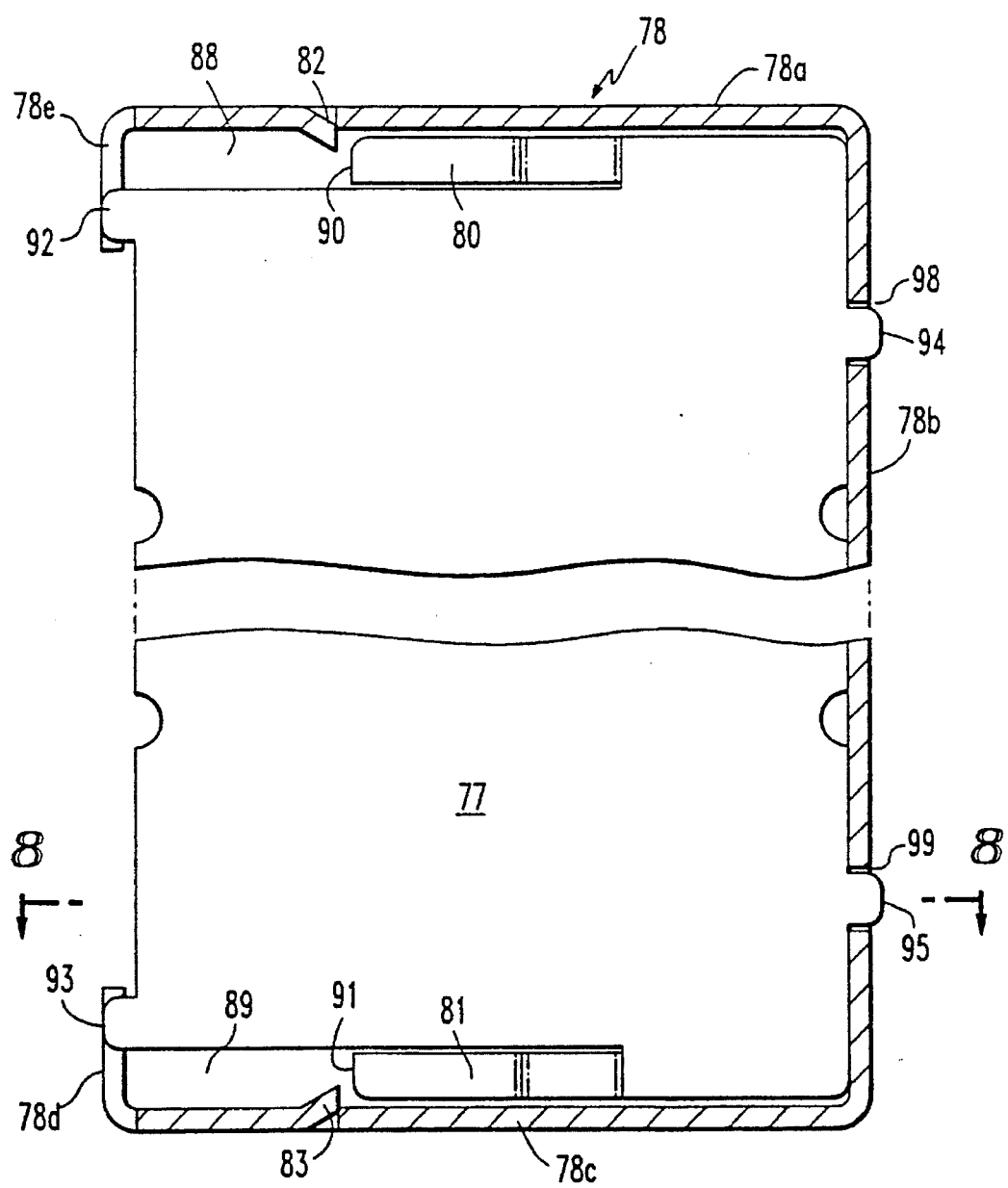
FIG. 7 is a partial side elevational view of a divider plate of a second embodiment of the invention mounted in an electrical box.

FIGS. 7 and 8 show a second embodiment for a divider plate 77 installed in an electrical box 78 which may be similar to electrical box 10 of FIG. 1. Plate 77 is similar in design and its installation into electrical box 78 is similar to plates 15 and 17 into electrical box 10, however, the sheared tabs 80 and 81 of plate 77 are relatively shorter than tabs 64,66 of plate 17. In order to self-lock plate 77 in box 78 and to keep it from moving out of box 78, sheared projection means indicated at 82 and 83 in FIG. 7 are formed by a punch tool through the top wall 78a and bottom wall 78c of box 78. As can be best seen in FIG. 8, projection means 83 consists of a pair of projections 83a and 83b. These projections 83a and 83b when referring particularly to FIG. 7, extend into an opened or recessed area 89 formed by sheared tab 81 and lower front ledge 78d and are disposed in front of and adjacent to the front end 91 of sheared tab 81. Projection means 82 in top wall 78a consists of projections similar to projections 83a,83b of projection means 83 and are located adjacent to sheared tab 80. Projection means 82 and 83 keep plate 77 in box 78. Removal of plate 77 simply entails projection means 82 and 83 to be first flattened by a tool against an inside surface of top wall 78a and bottom wall 78c, respectively, of box 78. A tool can then be used to flatten sheared tabs 80,81 of plate 77 while at the same time pulling plate 77 outwardly. Front tangs 92,93 and back tangs 94,95 of plate 77 are similar to those provided in plate 17 and are disposed in their respective slots which are indicated at 98 and 99 in FIG. 7 for tangs 94,95, respectively. Electrical box 78 of FIG. 7 may be similar to box 10 of FIG. 1.

Electrical boxes 10 and 78 without the divider plates 15, 17, and 77 of the invention are available in the market place and are used particularly for mounting one or more power conductor outlets, which do not according to the building code, require a barrier between each individual device.

As can be seen from the foregoing, plates 15, 17, and 77 can be used as a partition in an electrical box for forming separate compartments for safely installing a power conductor outlet next to a communication conductor outlet in the same electrical box, and to do so such that the plate is positively and automatically set without the use of tools for its installation. Divider plates 15, 17 and 77 can be formed from a flat sheet of metal where the front and rear longitudinal edges are machined or cut to form the tangs and the sheared tabs are formed by a process well known in the art which may include dies.

Whereas, particular embodiments of the invention have been described above for purposes of illustration, it will be appreciated by those skilled in the art that numerous variations of the details may be made without departing from the invention as described in the appended claims.

In accordance with the provisions of the patent statutes, we have explained the principles and operation of our invention and have illustrated and described what we consider to be the best embodiments thereof.

We claim:

1. An electrical box, comprising:

a body formed by a back wall, a top wall, a bottom wall, a first sidewall, a second sidewall, and a partially formed front wall, said front wall having at least two adjacently spaced-apart ledges extending along said top wall and forming a first slot therebetween, and two adjacently spaced-apart ledges extending along said bottom wall and forming a second slot therebetween, said first slot being aligned with said second slot in a cooperative fashion, and a removable plate slidable in said cooperating aligned first and second slots of said front wall to form compartments in said electrical box, said plate further including integrally formed self-locking means which are operated by said aligned first and second slots when said plate is slid into said first and second slots to secure said plate in said body.

2. An electrical box of claim 1, wherein said self-locking means of said plate are biasing means located along at least a side edge thereof.

3. An electrical box, comprising;

a body formed by a back wall, a top wall, a bottom wall, a first sidewall, a second sidewall, and a partially formed front wall, said front wall having at least two adjacently spaced-apart ledges extending along said top wall and forming a first slot therebetween, and two adjacently spaced-apart ledges extending along said bottom wall and forming a second slot therebetween, said first slot being aligned with said second slot in a cooperative fashion, and a removable plate slidable in said cooperating aligned first and second slots of said front wall to form compartments in said electrical box, said plate further including integrally formed self-locking means which are operated by said aligned first and second slots when said plate is slid into said first and second slot to secure said plate in said body, and wherein said self-locking means of said plate are biasing means located along at least a side edge of said plate, said biasing means including at least one integrally formed sheared tab which extends parallel to said side edge of said plate and toward a front longitudinal edge of said plate.

4. An electrical box of claim 3, wherein said at least one integrally formed sheared tab consists of a plurality of integrally formed sheared tabs which are substantially shorter than said side edge to form a recessed area between said sheared tabs and said front wall, and wherein said body further includes retainer means extending into said recessed area and associated with said sheared tabs for preventing said plate from being moved out of said front wall of said body of said electrical box.

5. An electrical box of claim 4, wherein said retainer means include sheared projections formed from said top and bottom walls of said body.

6. An electrical box of claim 3, wherein said at least one sheared tab extends parallel to a planar surface of said plate and is off-set therefrom.

7. An electrical box of claim 3, wherein said plate further comprises a front tang located along a front edge thereof and adjacent to said self-locking means;

said front tang formed to be disposed in at least one of said first and second slots of said front wall and to abut against inside surfaces thereof for preventing sideward movement of said front edge of said plate in said body of said electrical box.

8. An electrical box of claim 3, wherein said plate further comprises a rear tang located along a rear edge of said plate, and further comprising an aperture in said back wall of said body for receiving said rear tang of said plate for preventing sideward movement of said rear edge of said plate in said body.

9. An electrical box of claim 3, wherein said plate is a generally flat metal sheet.

10. An electrical box of claim 2, wherein said biasing means consists of a plurality of integrally formed sheared tabs which are substantially shorter than said side edge to form a recessed area between said sheared tabs and said front wall, and wherein said body further includes retainer means extending into said recessed area and associated with said sheared tabs for preventing said plate from being moved out of said front wall of said body of said electrical box.

11. An electrical box of claim 10, wherein said retainer means include sheared projections formed from said top and bottom walls of said body.

12. An electrical box of claim 2, wherein said biasing means comprises at least one sheared tab which extends parallel to a planar surface of said plate and is off-set therefrom.

13. An electrical box of claim 1, wherein said plate further comprises a front tang located along a front edge thereof and adjacent to said self-locking means;

said front tang formed to be disposed in at least one of said first and second slots of said front wall and to abut against inside surfaces thereof for preventing sideward movement of said front edge of said plate in said body of said electrical box.

14. An electrical box of claim 1, wherein said plate further comprises a rear tang located along a rear edge of said plate, and further comprising an aperture in said back wall of said body for receiving said rear tang of said plate for preventing sideward movement of said rear edge of said plate in said body.

15. An electrical box of claim 1, wherein said plate is a generally flat metal sheet.

16. An electrical box comprising:

a base wall parametrically bounded by an outer wall extending upwardly therefrom defining a box interior, said outer wall having an upper end;

a front wall disposed on said upper end of said outer wall and partially covering said box interior, said front wall defining at least one pair of aligned slots;

a plate, said plate being slidable within said aligned slots to form compartments in said box, said plate having integrally formed self-locking means for securing said plate in said box, said locking means being operable by said slots upon sliding said plate into said slots.

* * * * *